US008191376B2

(12) United States Patent
Fox et al.

(10) Patent No.: US 8,191,376 B2
(45) Date of Patent: Jun. 5, 2012

(54) VALVE AND SUBCOOLER FOR STORING REFRIGERANT

(75) Inventors: William B. Fox, Onalaska, WI (US); George M. Singh, La Crosse, WI (US); Scott A. Munns, Onalaska, WI (US)

(73) Assignee: Trane International Inc., Piscataway, NJ (US)

( * ) Notice: Subject to any disclaimer, the term of this patent is extended or adjusted under 35 U.S.C. 154(b) by 608 days.

(21) Appl. No.: 12/456,629

(22) Filed: Jun. 18, 2009

(65) Prior Publication Data

US 2010/0319369 A1 Dec. 23, 2010

(51) Int. Cl.
*F25B 41/00* (2006.01)
*F25B 13/00* (2006.01)
*F25B 39/04* (2006.01)

(52) U.S. Cl. ........................... 62/174; 62/324.4; 62/509

(58) Field of Classification Search ............. 62/79, 174, 62/324.6, 324.4, 509; 165/62
See application file for complete search history.

(56) References Cited

U.S. PATENT DOCUMENTS

| | | | |
|---|---|---|---|
| 4,321,801 | A | 3/1982 | Collard, Jr. |
| 5,065,586 | A | 11/1991 | Shapiro-Baruch |
| 6,122,923 | A | 9/2000 | Sullivan |
| 6,644,066 | B1 | 11/2003 | Dolcich |
| 7,299,646 | B2 | 11/2007 | Ezaki et al. |

FOREIGN PATENT DOCUMENTS

| | | |
|---|---|---|
| GB | 2 091 404 A | 1/1982 |

*Primary Examiner* — Chen Wen Jiang
(74) *Attorney, Agent, or Firm* — William O'Driscoll

(57) ABSTRACT

A reversible HVAC heating/cooling refrigerant system includes a novel valve system that allows an outdoor heat exchanger to function as a subcooler during a cooling or defrost mode and function as a receiver tank for storing excess liquid refrigerant during a heating mode. In the heating mode, a cooling expansion valve is kept slightly open to flood the subcooler with liquid refrigerant while a heating expansion valve is regulated to maintain a desired level of superheat at the suction side of the refrigerant system's compressor. The novel valve system also serves as a pressure relief valve to protect the subcooler from excess pressure caused by thermal expansion of liquid refrigerant trapped within the subcooler.

19 Claims, 1 Drawing Sheet

10
Cool or Defrost
54
78
76
80
62
60
56
58
14
32
24
28
22
30
64
72
14b
14a
74
66
68
70
36
26
34
44
46
18
50
38
52
42
16
48
40
82
12

10
Heat
54
78
80
62
60
56
58
14
32
24
28
22
30
76
14b
14a
74
66
68
70
36
26
34
44
46
18
50
38
52
42
16
48
40
82
12

VALVE AND SUBCOOLER FOR STORING REFRIGERANT

BACKGROUND OF THE INVENTION

1. Field of the Invention

The subject invention generally pertains to refrigerant systems and more specifically to a valve and subcooler arrangement for storing excess refrigerant charge during a heating mode.

2. Description of Related Art

Reversible HVAC refrigerant systems (e.g., a reversible heat pump) selectively operable in heating and cooling modes typically require a greater charge of refrigerant in the cooling mode than in the heating mode. To accommodate the difference in charge, many reversible refrigerant systems include a receiver or holding tank for storing excess liquid refrigerant during the heating mode. Such receivers, however, can be rather large and thus expensive.

Consequently, there appears to be a need for a better way of dealing with a reversible refrigerant system's changing demand for refrigerant charge as the system switches between a heating a cooling mode.

SUMMARY OF THE INVENTION

It is an object of some embodiments of the invention to provide a reversible heating/cooling refrigerant system with a heat exchanger that serves as a subcooler during the cooling mode and serves as a liquid storage vessel for storing excess liquid refrigerant during a heating mode.

Another object of some embodiments is to provide the refrigerant system with a pressure-actuated switching valve that changes a heat exchanger from being a subcooler to being a receiver holding tank.

Another object of some embodiments is to enable such a pressure-actuated switching valve to further function as a pressure relief valve to protect a heat exchanger from excess pressure caused by thermal expansion of a trapped charge of liquid refrigerant.

Another object of some embodiments is to use a cooling expansion valve during a heating mode as a means for transferring excess liquid refrigerant to a subcooler for storage and to keep the subcooler pressurized to keep the charge subcooled.

Another object of some embodiments is to configure a main coil and a subcooler of an exterior heat exchanger such that in a cooling mode the refrigerant in the subcooler flows in somewhat of a counter-flow pattern with respect to the outside air flowing across the heat exchanger.

Another object of some embodiments is to configure a main coil and a subcooler of an exterior heat exchanger such that in a heating mode the refrigerant in the main coil flows in somewhat of a counter-flow pattern with respect to the outside air flowing across the heat exchanger.

Another object of some embodiments is to provide a reversible heating/cooling refrigerant system with a transition mode that, without an operating compressor, naturally transfers liquid refrigerant to areas of the system where the liquid refrigerant will unlikely be inhaled later by the compressor upon switching to a cooling or defrost mode.

One or more of these and/or other objects of the invention are provided by a reversible heating/cooling refrigerant system that includes a valve system operating in conjunction with a subcooler such that the subcooler functions as a liquid refrigerant holding receiver during the heating mode, and the valve system functions as a pressure relief valve to protect the subcooler from bursting should the stored liquid refrigerant thermally expand while being hermetically trapped within the subcooler.

The present invention provides a refrigerant system being operable in at least a heating mode and containing a refrigerant in heat transfer relationship with an outside fluid for ultimately heating a comfort zone or a process. The refrigerant system comprises a heat exchanger system containing at least some of the refrigerant; a compressor periodically drawing the refrigerant at a suction pressure and discharging the refrigerant at a discharge pressure, thereby providing the refrigerant system with a high-pressure side and a low-pressure side; and a pressure relief valve defining an inlet and an outlet, wherein the inlet is connected in fluid communication with the heat exchanger system, the outlet is connected in fluid communication with the low-pressure side, and the pressure relief valve opens to release at least some of the refrigerant from within the heat exchanger system in response to the refrigerant within the heat exchanger system exceeding a maximum pressure limit, wherein the maximum pressure limit is even greater than the discharge pressure of the compressor.

The present invention also provides a refrigerant system containing a refrigerant and being selectively operable in a heating mode and a cooling mode for respectively heating and cooling a comfort zone or a process. The refrigerant system absorbs heat from an outside fluid when the refrigerant system is in the heating mode heating the comfort zone or a process and releases heat to the outside fluid when the refrigerant system is in the cooling mode cooling the comfort zone or a process. The refrigerant system comprises an exterior heat exchanger system that includes a main coil and a subcooler. The exterior heat exchanger system is arranged to release heat to the outside fluid when the refrigerant system is in the cooling mode and absorb heat from the outside fluid when the refrigerant system is in the heating mode. The main coil defines a first main port and a second main port in refrigerant fluid communication with each other through the main coil. The subcooler defines a first subcooler port and a second subcooler port in refrigerant fluid communication with each other through the subcooler. The refrigerant system also includes a valve system with pressure relief. The valve system defines a coil valve port and a subcooler valve port. The coil valve port is connected in refrigerant fluid communication with the second main port of the main coil. The subcooler valve port is connected in refrigerant fluid communication with the second subcooler port of the subcooler. The valve system has an open position and a closed position such that: in the open position, the valve system connects the coil valve port in refrigerant fluid communication with the subcooler valve port; in the closed position, the valve system substantially blocks refrigerant fluid communication therethrough between the coil valve port and the subcooler valve port; the valve system is in the open position when the refrigerant system is in the cooling mode; the valve system is in the closed position when the refrigerant system is in the heating mode while the refrigerant within the subcooler is below a predetermined pressure limit; and the valve system is in the open position when the refrigerant system is in the heating mode while the refrigerant within the subcooler is above the predetermined pressure limit.

The present invention further provides a method of operating a refrigerant system that is selectively operable in a heating mode and a cooling mode, wherein the refrigerant system includes a main coil and a subcooler containing a refrigerant that is in heat transfer relationship with an outside fluid. The method comprises: in the cooling mode, releasing heat from the main coil and the subcooler to the outside fluid; in the heating mode, transferring heat from the outside fluid to the main coil as the refrigerant flows therethrough; in the heating mode, trapping within the subcooler at least some of the refrigerant, wherein most of the refrigerant trapped within the subcooler is in a liquid state; and releasing at least some of the refrigerant from within the subcooler if the refrigerant within the subcooler reaches a predetermined maximum pressure limit while still retaining substantially all of the refrigerant within the refrigerant system.

DESCRIPTION OF THE PREFERRED EMBODIMENT

Figure 1:
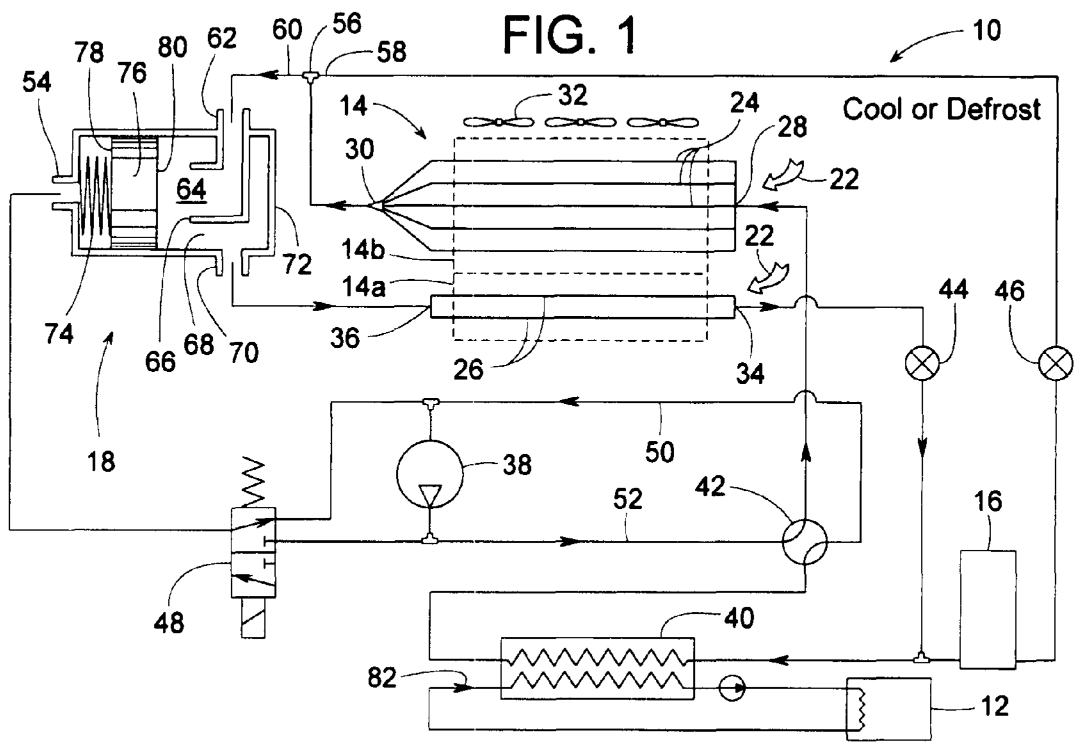
FIG. 1 is a schematic diagram of one example of a refrigerant system in a cooling or defrost mode.
Figure 2:
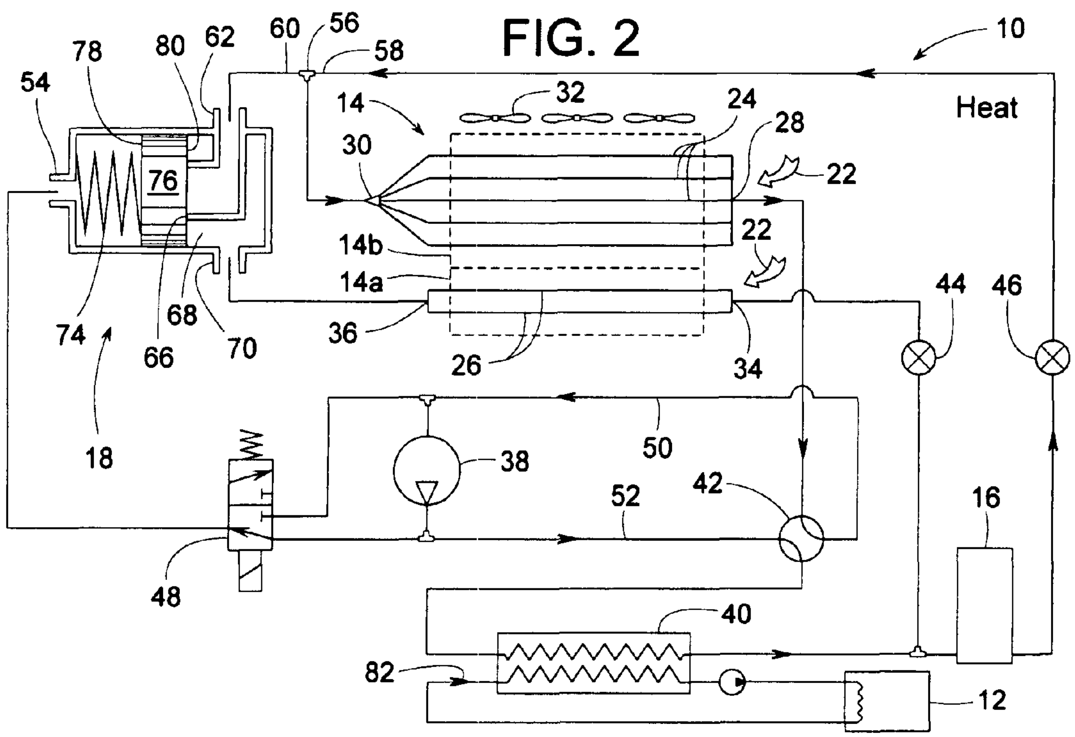
FIG. 2 is a schematic diagram of the refrigerant system in a heating mode.

FIGS. 1 and 2 schematically illustrate a refrigerant system 10 selectively operable in a cooling mode (FIG. 1) and a heating mode (FIG. 2) to cool or heat a comfort zone 12, such as a room or other trea in a building or for heating or cooling some process (e.g., heating or cooling a chemical). The cooling mode can also be used as a defrost mode that periodically interrupts the heating mode to defrost an exterior heat exchanger system 14. System 10 requires a greater refrigerant charge for cooling than for heating, so a tank receiver 16 helps store some excess liquid refrigerant during the heating mode.

To minimize the required size of receiver 16, a unique valve system 18 works in conjunction with exterior heat exchanger system 14 to store an additional amount of the heating mode's excess liquid refrigerant in a subcooler 14*a* of heat exchanger 14. Although valve system 18 is shown as a single, multipurpose valve, valve system 18 could also be an equivalent circuit of multiple diverse valves including, for example, a 3-way directional valve 48.

The design of exterior heat exchanger 14 may also vary. The expression, "exterior heat exchanger" refers to any heat exchanger that exchanges heat with an outside fluid 22 (e.g., outdoor air); however, an exterior heat exchanger does not necessarily have to be installed physically outdoors. The heat transfer between exterior heat exchanger 14 and outside fluid 22 can occur directly or it can happen indirectly via an intermediate heat transfer fluid, such as water.

Exterior heat exchanger 14 comprises a main coil 14*b* and subcooler 14*a*. The expression, "main coil," and the term, "subcooler," simply refer to any type of heat exchanger and are not meant to describe any particular design. Main coil 14*b* and subcooler 14*a* can be two separate heat exchangers, or they can be combined in some way, for instance, by sharing the same heat transfer fins. For sake of example, main coil 14*b* comprises a series of refrigerant-conveying tubes 24 traversing a plurality of heat transfer fins across which outside fluid 22 passes. Subcooler 14*a* also comprises a series of refrigerant-conveying tubes 26 traversing preferably the same fins as main coil 14*b*. For performance reasons, there are more tubes 24 in main coil 14*b* than there are tubes 26 in subcooler 14*a*.

Main coil 14*b* includes a first main port 28 and a second main port 30 (also known as a distributor) in refrigerant fluid communication with each other via tubes 24 (i.e., refrigerant flows between ports 28 and 30). First main port 28 preferably is upstream of second main port 30 with reference to a current of outside air or fluid 22. The current of outside air or fluid 22 is driven by one or more fans 32 associated with exterior heat exchanger system 14. Subcooler 14*a* includes a first subcooler port 34 and a second subcooler port 36 in refrigerant fluid communication with each other via tubes 26. First subcooler port 34 preferably is upstream of second subcooler port 36 with reference to the current of outside air or fluid 22 (e.g., fluid 22 first flows generally across port 34 and then across port 36).

In addition to exterior heat exchanger system 14, receiver tank 16 and valve system 18, refrigerant system 10 also includes at least one compressor 38 for compressing a refrigerant; a comfort zone heat exchanger 40 for heating or cooling comfort zone 12 or a process; a 2-position, 4-way directional valve 42 for selectively switching between the heating mode and the cooling mode (also defrost mode); a cooling expansion valve 44; a heating expansion valve 46; and a 2-position, 3-way directional valve 48 for controlling valve system 18. In this example, valves 42 and 48 are solenoid otherwise electrically actuated with their normally de-energized state being as shown in FIG. 1, and their energized state being as shown in FIG. 2. Those of ordinary skill in the art should appreciate, however, that the energized and de-energized states could be reversed and that there are many other conceivable ways of actuating directional valves.

With refrigerant system 10 in operation, compressor 38 draws in relatively cool gaseous refrigerant at a suction pressure from a low-pressure side 50 of system 10 and discharges gaseous refrigerant to a high-pressure side 52 at an appreciably higher discharge pressure and temperature. In the cooling mode, shown in FIG. 1, 3-way valve 48 applies suction pressure to a pilot port 54 that opens valve system 18, and 4-way valve 42 directs relatively hot discharge refrigerant to first main port 28 of main coil 14*b*. From first main port 28, the refrigerant flows through tubes 24 to second main port 30. Upon passing through main coil 14*b*, the relatively hot discharge refrigerant cools and may at least partially condense as it releases heat to outside fluid 22.

The now cooler and perhaps liquid refrigerant flows from second main port 30 to a tee 56. A right leg 58 of tee 56 is blocked off by heating valve 46 being closed, so the refrigerant flows through a left leg 60 of tee 56 toward valve system 18, which is open during the cooling mode. The refrigerant passes through open valve system 18 by flowing sequentially through a coil valve port 62, an opening 64 through a valve seat 66, an annular passageway 68 encircling opening 64, and out through a subcooler valve port 70.

In this example of the invention, valve system 18 includes a valve housing 72 that includes valve seat 66 and defines opening 64; annular passageway 68; and ports 54, 62 and 70. Although a compression spring 74 urges a valve element 76 (e.g., a valve plug, diaphragm, piston, etc.) in sealing engagement against valve seat 66 to urge valve system 18 to a closed position (FIG. 2) where valve element 76 obstructs opening 64, in this embodiment, valve element 76 is a piston with one side 78 exposed to refrigerant pressure at pilot port 54 and an opposite side 80 exposed to refrigerant at opening 64 and annular passageway 68. In the cooling mode (and defrost mode), piston side 80 faces pressure at about that of high-pressure side 52, and piston side 78 faces pressure at about that of low-pressure side 50. The resulting pressure differential across piston 76 is sufficient to overpower the urging of spring 74, thus valve element 76 moves to a spaced-apart position relative to valve seat 66 to open valve system 18 as shown in FIG. 1.

After flowing through open valve system 18, the refrigerant flows from subcooler valve port 70 to enter subcooler 14*a* through second subcooler port 36. The refrigerant then flows through the subcooler's tubes 26 to the first subcooler port 34.

Upon passing through subcooler 14*a*, the refrigerant releases more heat to outside fluid 22 to ensure that the relatively high-pressure refrigerant is thoroughly condensed and has some amount of subcooling.

The condensed high-pressure refrigerant flows through cooling expansion valve 44, which is regulated in a conventional manner to reduce the refrigerant pressure and thus cool the refrigerant by expansion. The relatively cool, low-pressure refrigerant leaving expansion valve 44 then flows through comfort zone heat exchanger 40 to cool comfort zone 12. Upon absorbing heat from a secondary heat transfer fluid 82 that cools comfort zone 12, the refrigerant vaporizes, and 4-way valve 42 directs the relatively cool gaseous refrigerant back to low-pressure side 50 where the refrigerant returns to compressor 38, thereby perpetuating the refrigerant cycle in the cooling mode.

Since receiver 16 is exposed to suction pressure of low-pressure side 50, any liquid refrigerant that happens to be in receiver 16 (just prior to operating in the cooling mode) tends to vaporize, thus leaving receiver 16 substantially void of liquid refrigerant during the cooling mode.

In the heating mode, shown in FIG. 2, 3-way valve 48 applies discharge pressure to pilot port 54 to close valve system 18, and 4-way valve 42 directs relatively hot discharge refrigerant through comfort zone heat exchanger 40 to heat comfort zone 12. As the refrigerant passes through comfort zone heat exchanger 40, the refrigerant condenses by releasing heat to secondary heat transfer fluid 82, which now heats comfort zone 12. From heat exchanger 40, the condensed refrigerant flows to receiver 16, cooling expansion valve 44 and heating expansion valve 46.

During the heating mode, liquid refrigerant flowing through receiver 16 fills the receiver with liquid refrigerant, whereby that amount refrigerant is effectively removed from the active part of the refrigerant circuit. For additional storage of liquid refrigerant, cooling expansion valve 44 is held partially open (e.g., 10% open) to feed liquid refrigerant into subcooler 14*a* where liquid refrigerant stagnates between closed valve system 18 and cooling expansion valve 44, thereby effectively removing that refrigerant from the active part of the refrigerant circuit. The liquid refrigerant flowing from comfort zone heat exchanger 40 through receiver 16 then to heating expansion valve 46 is the portion of refrigerant that is actively used in the heating mode.

Heating expansion valve 46 can be regulated in a conventional manner to maintain a desired level of superheat of refrigerant at low-pressure side 50. As the refrigerant passes through the regulated heating expansion valve 46, the refrigerant cools by expansion. The relatively cool refrigerant then flows to tee 56. Since valve system 18 is closed, the refrigerant flows from tee 56 to second main port 30 and then to first main port 28 by flowing through tubes 24 of main coil 14*b*. Upon passing through main coil 14*b*, the relatively cool refrigerant absorbs heat from outside fluid 22. This causes the refrigerant to vaporize before 4-way valve 42 directs the now gaseous refrigerant back to low-pressure side 50 where the refrigerant returns to compressor 38, thereby perpetuating the refrigerant cycle in the heating mode.

Although relatively high discharge pressure at pilot port 54 forces valve element 76 to its closed position of FIG. 2, valve system 18 can still serve as a pressure relief valve for subcooler 14*a*, wherein subcooler valve port 70 becomes the pressure relief valve's inlet and coil valve port 62 becomes the pressure relief valve's outlet. If, for instance, system 10 is turned off with valves 18 and 44 closed, liquid refrigerant can be left trapped within subcooler 14*a* between valves 18 and 44. If the ambient temperature then increases, this can cause the trapped liquid to expand by thermal expansion, which could increase the refrigerant's pressure to a magnitude that exceeds the compressor's maximum discharge pressure and perhaps exceed the burst pressure of tubes 26. To avoid damaging tubes 26, spring 74 and the cross-sectional areas of opening 64 and annular passageway 68 are designed such that if the pressure against side 80 of valve element 76 exceeds a predetermined maximum pressure limit, that pressure will be sufficient to force valve system 18 to its open position (FIG. 1), whereby the excessively high pressure at stibcooler valve port 70 is relieved to the lower pressure at coil valve port 62. It should be noted that said, "predetermined maximum pressure limit," may vary as a function of the pressure on side 78 of valve element 76. It might also be noted that valve system 18 could also function as a pressure relief for main coil 14*b*, wherein sufficient pressure at opening 64 could also force valve system 18 to open. In the later example where valve system 18 serves as a pressure relief valve for main coil 14*b*, the pressure relief valve would have its inlet at coil valve port 62 and its outlet at subcooler valve port 70.

Before suddenly switching from the heating mode (FIG. 2) to the cooling or defrost mode (FIG. 1), refrigerant system 10 preferably operates momentarily (e.g., 10-second period) in a transition mode to prevent compressor 38 from inhaling a slug of liquid refrigerant from receiver 16. The transition mode is similar in configuration to the cooling mode with valve system 18 open and valves 42 and 48 de-energized as shown in FIG. 1; however, in the transition mode, compressor 38 is inactive, fan 32 is inactive, heating expansion valve 46 is at least partially open (e.g., 25% open), and cooling expansion valve 44 is at least partially open (e.g., 10% open). The transition mode allows an appreciable amount of liquid refrigerant in receiver 16 to flow into exterior heat exchanger 14 and allows some liquid refrigerant in subcooler 14*a* to flow into main coil 14*b*.

Switching from the defrost mode of FIG. 1 to the heating mode of FIG. 2 preferably is done in the following sequence: step-1) compressor 38 is de-energized; step-2) valve 48 is shifted to the position of FIG. 2 with little to no time delay between steps 1 and 2; step-3) close cooling expansion valve 44; step-4) is a time delay of 5 to 30 seconds (preferably about 15 to 20 seconds); step-5) valve 42 shifts to the position of FIG. 2; step-6) energize compressor 38, wherein steps 5 and 6 are performed simultaneously or within about two seconds of each other; step-7) cooling expansion valve 44 partially opens (e.g., about 20% open); and step-8) heating expansion valve 46 is regulated.

Although the invention is described with respect to a preferred embodiment, modifications thereto will be apparent to those of ordinary skill in the art. The scope of the invention, therefore, is to be determined by reference to the following claims:

The invention claimed is:

1. A refrigerant system being operable in at least a heating mode and containing a refrigerant in heat transfer relationship with an outside fluid for ultimately heating a comfort zone or a process, the refrigerant system comprising:

a heat exchanger system containing at least some of the refrigerant;

a compressor periodically drawing the refrigerant at a suction pressure and discharging the refrigerant at a discharge pressure, thereby providing the refrigerant system with a high-pressure side and a low-pressure side; and a pressure relief valve defining an inlet and an outlet, the inlet is connected in fluid communication with the heat exchanger system, the outlet is connected in fluid communication with the low-pressure side, the pressure relief valve opens to release at least some of the refrigerant from within the heat exchanger system in response to the refrigerant within the heat exchanger system exceeding a maximum pressure limit, wherein the maximum pressure limit is even greater than the discharge pressure of the compressor.

2. The refrigerant system of claim 1, wherein the heat exchanger system includes a main coil and a subcooler, the main coil absorbs heat from the outside fluid, and the subcooler stores a trapped amount of refrigerant in a liquid state.

3. The refrigerant system of claim 2, wherein the inlet of the pressure relief valve is connected in fluid communication with the subcooler.

4. The refrigerant system of claim 2, wherein the refrigerant can exceed the maximum pressure limit by virtue of the refrigerant thermally expanding within the subcooler.

5. The refrigerant system of claim 1, further comprising a directional valve, and the pressure relief valve further defines a pilot port connected in fluid communication with the directional valve, the directional valve couples the pilot port in fluid communication selectively to the low-pressure side and the high-pressure side.

6. A refrigerant system containing a refrigerant and being selectively operable in a heating mode and a cooling mode for respectively heating and cooling a comfort zone or a process, wherein the refrigerant system absorbs heat from an outside fluid when the refrigerant system is in the heating mode heating the comfort zone or process and releases heat to the outside fluid when the refrigerant system is in the cooling mode cooling the comfort zone or process, the refrigerant system comprising:

an exterior heat exchanger system that includes a main coil and a subcooler, the exterior heat exchanger system is arranged to release heat to the outside fluid when the refrigerant system is in the cooling mode and absorb heat from the outside fluid when the refrigerant system is in the heating mode, the main coil defines a first main port and a second main port in refrigerant fluid communication with each other through the main coil, the subcooler defines a first subcooler port and a second subcooler port in refrigerant fluid communication with each other through the subcooler; and a valve system with pressure relief, the valve system defines a coil valve port and a subcooler valve port, the coil valve port is connected in refrigerant fluid communication with the second main port of the main coil, the subcooler valve port is connected in refrigerant fluid communication with the second subcooler port of the subcooler, the valve system has an open position and a closed position such that:

a) in the open position, the valve system connects the coil valve port in refrigerant fluid communication with the subcooler valve port;

b) in the closed position, the valve system substantially blocks refrigerant fluid communication therethrough between the coil valve port and the subcooler valve port;

c) the valve system is in the open position when the refrigerant system is in the cooling mode;

d) the valve system is in the closed position when the refrigerant system is in the heating mode while the refrigerant within the subcooler is below a predetermined pressure limit; and e) the valve system is in the open position when the refrigerant system is in the heating mode while the refrigerant within the subcooler is above the predetermined pressure limit.

7. The refrigerant system of claim 6, wherein the valve system includes a valve housing that defines the coil valve port, the subcooler valve port, and a valve seat; the valve seat defines an opening between the coil valve port and the subcooler valve port, the refrigerant system further comprises a valve element disposed within the valve housing and being movable relative to the valve seat such that the valve element engages the valve seat to obstruct the opening when the valve system is in the closed position, and the valve element is spaced apart from the valve seat to uncover the opening when the valve system is in the open position, whereby the valve element moves to selectively obstruct and clear refrigerant flow through the valve housing.

8. The refrigerant system of claim 7, wherein the valve housing defines an annular passageway that encircles the opening, the annular passageway and the opening are each in fluid communication with only one of the coil valve port and the subcooler valve port when the valve system is in the closed position.

9. The refrigerant system of claim 7, wherein the refrigerant system includes a high pressure side and a lower pressure side, and the valve housing further defines a pilot port connected in fluid communication selectively to the high pressure side and the low pressure side such that a change in pressure at the pilot port urges the valve system between the open position and the closed position.

10. The refrigerant system of claim 7, further comprising a spring disposed within the valve housing such that the spring urges the valve element toward the valve seat.

11. The refrigerant system of claim 7, wherein during the cooling mode, refrigerant flows sequentially through the first main port of the main coil, through the main coil, through the second main port of the main coil, through the coil valve port of the valve housing, through the valve housing, through the subcooler valve port of the valve housing, through the second subcooler port of the subcooler, through the subcooler, and through the first subcooler port of the subcooler.

12. The refrigerant system of claim 6, wherein during the heating mode, refrigerant condenses in the subcooler.

13. The refrigerant system of claim 6, wherein the outside fluid is a current of air, and further comprising a fan forcing the current of air across the exterior heat exchanger system, wherein the first main port is generally upstream of the second main port with reference to the current of air during the cooling mode, and the first subcooler port is generally downstream of the second subcooler port with reference to the current of air during the cooling mode.

14. The refrigerant system of claim 6, wherein the refrigerant condenses in the subcooler during the heating mode.

15. The refrigerant system of claim 6, further comprising a cooling expansion valve and a heating expansion valve connected in refrigerant fluid communication with the exterior heat exchanger system such that:

a) in the cooling mode, the heating expansion valve is substantially closed, and the refrigerant flows sequentially from the first subcooler port through the cooling expansion valve, and b) in the heating mode, the refrigerant flows sequentially from the heating expansion valve, through the second main port and through the main coil while the cooling expansion valve is partially open to flood the subcooler with refrigerant in liquid form.

16. The refrigerant system of claim 15, wherein the refrigerant system is further operable in a transition mode during a period after the heating mode and before the cooling mode, and further comprising a compressor connected to force the refrigerant through the refrigerant system and a fan disposed in air fluid communication with the exterior heat exchanger system, wherein:

a) the compressor is inactive during the transition mode, b) the fan is inactive during the transition mode, c) the cooling expansion valve is at least partially open during the transition mode, and d) the heating expansion valve is at least partially open during the transition mode.

17. The refrigerant system of claim 16, further comprising a receiver tank connected in refrigerant fluid communication with the cooling expansion valve and the heating expansion valve, wherein at least some refrigerant from at least one of the subcooler and the receiver tank flows to the main coil during the transition mode.

18. A method of operating a refrigerant system that is selectively operable in a heating mode and a cooling mode, wherein the refrigerant system includes a main coil and a subcooler containing a refrigerant that is in heat transfer relationship with an outside fluid, the method comprising:

in the cooling mode, releasing heat from the main coil and the subcooler to the outside fluid;

in the heating mode, transferring heat from the outside fluid to the main coil as the refrigerant flows therethrough;

in the heating mode, trapping within the subcooler at least some of the refrigerant, wherein most of the refrigerant trapped within the subcooler is in a liquid state; and releasing at least some of the refrigerant from within the subcooler if the refrigerant within the subcooler reaches a predetermined maximum pressure limit while still retaining substantially all of the refrigerant within the refrigerant system.

19. The method of claim 18, wherein the refrigerant system also includes a compressor capable of discharging the refrigerant at a maximum discharge pressure, wherein the maximum discharge pressure is less than the predetermined maximum pressure limit.

* * * * *